United States Patent
Horley et al.

(10) Patent No.: US 10,120,813 B2
(45) Date of Patent: Nov. 6, 2018

(54) ADDRESS TRANSLATION

(71) Applicant: ARM Limited, Cambridge (GB)

(72) Inventors: John Michael Horley, Cambridge (GB); Dan Brook, Cambridge (GB)

(73) Assignee: ARM Limited, Cambridge (GB)

( * ) Notice: Subject to any disclaimer, the term of this patent is extended or adjusted under 35 U.S.C. 154(b) by 65 days.

(21) Appl. No.: 15/452,989

(22) Filed: Mar. 8, 2017

(65) Prior Publication Data

US 2018/0260335 A1 Sep. 13, 2018

(51) Int. Cl.
*G06F 12/1009* (2016.01)
*G06F 12/1036* (2016.01)

(52) U.S. Cl.
CPC ...... *G06F 12/1009* (2013.01); *G06F 12/1036* (2013.01); *G06F 2212/656* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 4,758,946 A * | 7/1988 | Shar | ............ | G06F 12/1009 711/206 |
| 6,061,773 A * | 5/2000 | Harvey | ............ | G06F 12/1036 711/206 |
| 6,275,830 B1 * | 8/2001 | Muthukkaruppan | ... | G06F 12/10 |
| 6,751,583 B1 * | 6/2004 | Clarke | ............ | G06F 17/5022 703/17 |
| 7,558,939 B2 * | 7/2009 | Banerjee | ............ | G06F 12/1027 711/205 |
| 9,535,849 B2 * | 1/2017 | Kegel | ............ | G06F 12/1081 |
| 9,779,033 B2 * | 10/2017 | Hashimoto | ......... | G06F 12/1416 |
| 9,996,474 B2 * | 6/2018 | Ter-Grigoryan | ..... | G06F 12/1009 |
| 2003/0126398 A1 * | 7/2003 | Shinozaki | ............ | G06F 12/10 711/206 |

(Continued)

*Primary Examiner* — Midys Rojas
*Assistant Examiner* — Khoa D Doan
(74) *Attorney, Agent, or Firm* — Nixon & Vanderhye P.C.

(57) ABSTRACT

Address translation apparatus comprises translation circuitry to access an ordered set of two or more address translation tables stored at respective storage locations to generate an address translation between an input virtual memory address in a virtual memory address space and a respective translated memory address in a translated memory address space. Each address translation table in the ordered set of two or more address translation tables is configured to provide translation data indicating mappings between virtual memory addresses and translated memory addresses for a contiguous range of virtual memory addresses applicable to that address translation table. The ordered set of address translation tables are ordered with respect to one another according to an order of their respective ranges of virtual memory addresses for which they provide translation data. Each address translation table in the ordered set of two or more address translation tables comprises location information defining the storage location of at least those of the other address translation tables in the ordered set of two or more address translation tables which are adjacent to that address translation table in the ordered set of two or more address translation tables.

20 Claims, 6 Drawing Sheets

(56) References Cited

U.S. PATENT DOCUMENTS

| | | | | |
|---|---|---|---|---|
| 2003/0131253 A1* | 7/2003 | Martin | G06F 11/1471 | 726/6 |
| 2004/0215917 A1* | 10/2004 | Lambeth | G06F 12/0284 | 711/206 |
| 2004/0215919 A1* | 10/2004 | Emmes | G06F 12/1009 | 711/208 |
| 2005/0114607 A1* | 5/2005 | Cohen | G06F 12/1027 | 711/135 |
| 2006/0282644 A1* | 12/2006 | Wong | G06F 12/0246 | 711/206 |
| 2007/0038799 A1* | 2/2007 | Hummel | G06F 12/1027 | 711/3 |
| 2009/0182976 A1* | 7/2009 | Agesen | G06F 12/1009 | 711/207 |
| 2009/0210646 A1* | 8/2009 | Bauman | G06F 12/1081 | 711/170 |
| 2009/0316700 A1* | 12/2009 | White | H04L 45/00 | 370/392 |
| 2011/0055458 A1* | 3/2011 | Kuehne | G06F 12/0246 | 711/103 |
| 2011/0320758 A1* | 12/2011 | Craddock | G06F 12/0292 | 711/206 |
| 2013/0326121 A1* | 12/2013 | Cheng | G06F 12/0246 | 711/103 |
| 2014/0129797 A1* | 5/2014 | Arndt | G06F 12/1027 | 711/206 |
| 2015/0058597 A1* | 2/2015 | King | G06F 12/1081 | 711/206 |
| 2015/0067297 A1* | 3/2015 | Arroyo | G06F 12/1009 | 711/206 |
| 2015/0356024 A1* | 12/2015 | Loh | G06F 12/1054 | 711/113 |
| 2016/0283396 A1* | 9/2016 | Ter-Grigoryan | G06F 12/1009 | |
| 2017/0083451 A1* | 3/2017 | Tan | G06F 12/0246 | |
| 2017/0212843 A1* | 7/2017 | Agesen | G06F 12/1009 | |
| 2018/0018282 A1* | 1/2018 | Bradbury | G06F 12/1027 | |
| 2018/0081830 A1* | 3/2018 | Kaplan | G06F 12/1483 | |

* cited by examiner

ADDRESS TRANSLATION

BACKGROUND

This disclosure relates to address translation.

Address translation is used to translate between virtual memory addresses and translated memory addresses such as physical memory addresses or so-called intermediate physical addresses.

Address translation can be implemented by arrangements such as memory management units (MMUs) implementing look-up techniques such as page table walks. Such MMUs can be expensive in terms of integrated circuit area in a system implementation.

SUMMARY

In an example arrangement there is provided address translation apparatus comprising:

translation circuitry to access an ordered set of two or more address translation tables stored at respective storage locations to generate an address translation between an input virtual memory address in a virtual memory address space and a respective translated memory address in a translated memory address space;

in which:

each address translation table in the ordered set of two or more address translation tables is configured to provide translation data indicating mappings between virtual memory addresses and translated memory addresses for a contiguous range of virtual memory addresses applicable to that address translation table;

the ordered set of address translation tables are ordered with respect to one another according to an order of their respective ranges of virtual memory addresses for which they provide translation data; and each address translation table in the ordered set of two or more address translation tables comprises location information defining the storage location of at least those of the other address translation tables in the ordered set of two or more address translation tables which are adjacent to that address translation table in the ordered set of two or more address translation tables.

In another example arrangement there is provided address translation apparatus comprising:

translation means for accessing an ordered set of two or more address translation table means stored at respective storage locations and for generating an address translation between an input virtual memory address in a virtual memory address space and a respective translated memory address in a translated memory address space;

in which:

each address translation table means in the ordered set of two or more address translation table means is operable to provide translation data indicating mappings between virtual memory addresses and translated memory addresses for a contiguous range of virtual memory addresses applicable to that address translation table means;

the ordered set of address translation table means are ordered with respect to one another according to an order of their respective ranges of virtual memory addresses for which they provide translation data; and each address translation table means in the ordered set of two or more address translation table means comprises location information defining the storage location of at least any of the other address translation table means in the ordered set of two or more address translation table means which are adjacent to that address translation table means in the ordered set of two or more address translation table means.

In another example arrangement there is provided an address translation method comprising:

ordering a set of two or more address translation tables, stored at respective storage locations and which provide translation data indicating mappings between virtual memory addresses in a virtual memory address space and translated memory addresses in a translated memory address space for a contiguous range of virtual memory addresses applicable to that address translation table, with respect to one another according to an order of their respective ranges of virtual memory addresses for which they provide translation data;

providing, by each address translation table in the ordered set of two or more address translation tables, location information defining the storage location of at least any of the other address translation tables in the ordered set of two or more address translation tables which are adjacent to that address translation table in the ordered set of two or more address translation tables; and accessing an address translation table in the ordered set of two or more address translation tables to generate an address translation between an input virtual memory address in the virtual memory address space and a respective translated memory address in the translated memory address space.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
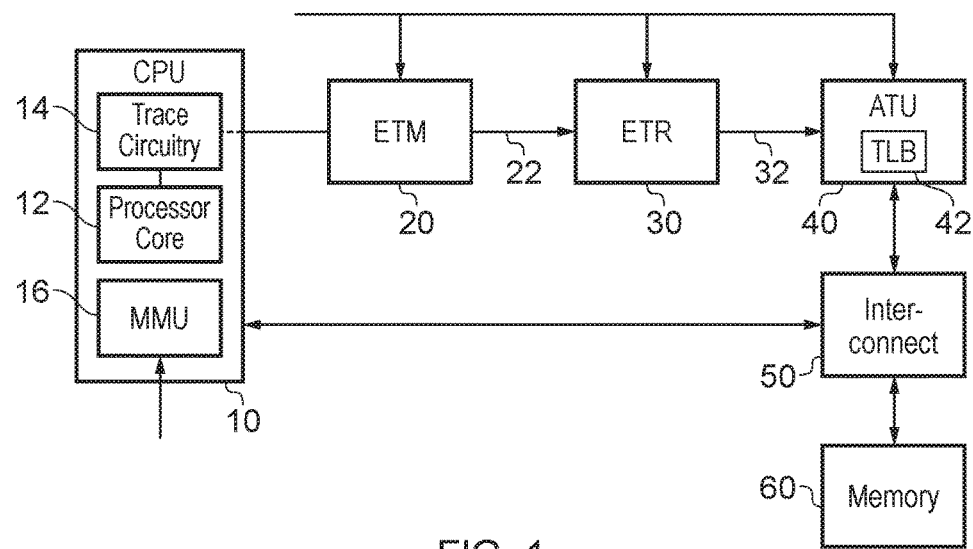
FIG. 1 schematically illustrates a data processing apparatus.

Before discussing the embodiments with reference to the accompanying figures, the following description of embodiments is provided.

An example embodiment provides address translation apparatus comprising:

translation circuitry to access an ordered set of two or more address translation tables stored at respective storage locations to generate an address translation between an input virtual memory address in a virtual memory address space and a respective translated memory address in a translated memory address space;

in which:

each address translation table in the ordered set of two or more address translation tables is configured to provide translation data indicating mappings between virtual memory addresses and translated memory addresses for a contiguous range of virtual memory addresses applicable to that address translation table;

the ordered set of address translation tables are ordered with respect to one another according to an order of their respective ranges of virtual memory addresses for which they provide translation data; and each address translation table in the ordered set of two or more address translation tables comprises location information defining the storage location of at least those of the other address translation tables in the ordered set of two or more address translation tables which are adjacent to that address translation table in the ordered set of two or more address translation tables.

The example embodiments can provide an efficient and (from the point of view of integrated circuit area in an implementation) potentially cheap technique for implementing address translation. By providing a bidirectionally linked list of translation data tables, a simple but easily navigable system is provided which is particularly suitable for generally linear write or read operations (such as, for example, trace data writing into a trace data buffer, video or audio streaming or the like) but which can also allow navigation through the translation data for non-linear accesses.

In some examples, each address translation table in the ordered set of two or more address translation tables comprises a plurality of instances of translation data, each instance of translation data providing a mapping for a respective sub-range of the contiguous range of virtual memory addresses applicable to that address translation table. For example, the mapping can be on a region by region or page by page basis so that each instance of translation data provides a mapping of one or more bits of the input virtual memory address other than a least significant portion of the input virtual memory address, to respective bits of the translated memory address.

In some examples, each instance of translation data has an associated indicator to indicate whether that instance of translation data represents a valid address translation. This can be particularly useful in situations where the contiguous range of virtual memory addresses applicable to each address translation table is aligned, within the virtual address space, to an alignment boundary selected from a set of alignment boundaries separated by a separation greater than the size, in the virtual address space, of the sub-ranges. Having a larger alignment boundary separation can make addressing more straightforward, and the validity indicator allows any instances of translation data which are (by virtue of the larger alignment boundary separation) not required to be marked as invalid.

In some examples the translation circuitry is configured to select an address translation table from the ordered set of two or more address translation tables according to an index dependent upon a most significant portion of the input virtual memory address. The translation circuitry can be configured, when the most significant portion of the input virtual memory address does not correspond to a currently accessed address translation table, to access another address translation table using the location information of the currently accessed address translation table.

Some example arrangements provide a buffer to store at least one instance of translation data. This can reduce the need for fetching translation data. For example, the translation circuitry may be configured to store in the buffer at least a first instance of translation data relating to a current input virtual memory address and a second instance of translation data relating to a sub-range of virtual memory addresses adjacent to the sub-range of virtual memory addresses of the first instance of translation data.

For example, a current and next translation may be buffered, in which case the sub-range of virtual memory addresses of the second instance of translation data is next-higher, in the virtual address space, than the sub-range of virtual memory addresses of the first instance of translation data. In situations where writing or reading of data is generally linear, this can provide efficiency and reduce the need for, and/or the latency caused by, fetching translation data.

In some examples the translation circuitry is configured to subtract an offset virtual memory address from the input virtual memory address.

To allow for more efficient traverses between non-adjacent tables, in some examples, one or more of the address translation tables in the ordered set of two or more address translation tables comprise further location information defining the storage location of one or more other address translation tables in the ordered set of two or more address translation tables separated from that address translation table by two or more positions in the ordered set of two or more address translation tables.

Another example embodiment provides trace apparatus comprising:

address translation apparatus as defined above; and trace circuitry configured to generate items of trace data indicative of processing activities of a processing element, the trace apparatus being configured to store the trace data according to respective virtual memory addresses;

the address translation apparatus being configured to translate the virtual memory addresses for storage of the trace data into respective translated memory addresses.

Another example embodiment provides data processing apparatus comprising:

address translation apparatus as defined above; and a memory system accessible according to the translated memory addresses;

in which:

the memory system is accessible by translated memory addresses subject to a constraint that a memory page having a memory page size represents a maximum size of a block of memory which is guaranteed to be allocated as a contiguous block in the translated address space; and each address translation table in the ordered set of two or more address translation tables is stored by the memory system as a memory region encompassing no more than a single memory page.

In example arrangements each address translation table in the ordered set of two or more address translation tables is stored by the memory system as a single memory page. The mapping can conveniently be on a page by page basis, in which each address translation table in the ordered set of two or more address translation tables comprises a plurality of instances of translation data, each instance of translation data providing a mapping between a respective sub-range of the contiguous range of virtual memory addresses applicable to that address translation table and a memory page of the memory system.

For convenience of addressing, in some examples the instances of translation data for an address translation table in the ordered set of two or more address translation tables are stored as one half of the memory page for that address translation table.

In an example embodiment the data processing apparatus comprises trace apparatus configured to generate items of trace data indicative of processing activities of a processing element; the trace apparatus being configured to store the trace data according to respective virtual memory addresses; and the address translation apparatus being configured to translate the virtual memory addresses for storage of the trace data into respective translated memory addresses.

Another example embodiment provides address translation apparatus comprising:

translation means for accessing an ordered set of two or more address translation table means stored at respective storage locations and for generating an address translation between an input virtual memory address in a virtual memory address space and a respective translated memory address in a translated memory address space;

in which:

each address translation table means in the ordered set of two or more address translation table means is operable to provide translation data indicating mappings between virtual memory addresses and translated memory addresses for a contiguous range of virtual memory addresses applicable to that address translation table means;

the ordered set of address translation table means are ordered with respect to one another according to an order of their respective ranges of virtual memory addresses for which they provide translation data; and each address translation table means in the ordered set of two or more address translation table means comprises location information defining the storage location of at least any of the other address translation table means in the ordered set of two or more address translation table means which are adjacent to that address translation table means in the ordered set of two or more address translation table means.

Another example embodiment provides an address translation method comprising:

ordering a set of two or more address translation tables, stored at respective storage locations and which provide translation data indicating mappings between virtual memory addresses in a virtual memory address space and translated memory addresses in a translated memory address space for a contiguous range of virtual memory addresses applicable to that address translation table, with respect to one another according to an order of their respective ranges of virtual memory addresses for which they provide translation data;

providing, by each address translation table in the ordered set of two or more address translation tables, location information defining the storage location of at least any of the other address translation tables in the ordered set of two or more address translation tables which are adjacent to that address translation table in the ordered set of two or more address translation tables; and accessing an address translation table in the ordered set of two or more address translation tables to generate an address translation between an input virtual memory address in the virtual memory address space and a respective translated memory address in the translated memory address space Referring now to FIG. 1, a data processing apparatus comprises a processing element (or central processing unit (CPU)) 10, an embedded trace macrocell (ETM, a trademark of ARM Limited, Cambridge) 20, an embedded trace router (ETR) 30, an address translation unit (ATU) 40, an interconnect 50 and a memory 60. Other devices (not shown) may be connected to the interconnect 50, such as other processors, or other slave devices such as memories, peripheral devices or the like.

The CPU 10 comprises (amongst other possible items) a processor core 12, trace circuitry 14 and a memory management unit (MMU) 16. The ATU comprises a translation lookaside buffer (TLB) 42. The operation of these items will be discussed further below.

There are a number of occasions where it is desirable to keep track of the processing activities being performed by a processing element such as a CPU. For example, such information is useful during the development of data processing apparatus. An example of a tool that may be used to assist in such a process is a tracing tool.

Tracing the activity of a processing element whereby a trace stream is generated that includes data representing the step-by-step activity within the system is a highly useful tool in system development. Such tracing tools use a variety of means for tracing the program flow including embedded trace macrocells which are present on the chip whose processing is being monitored. These tracing tools can be used to reconstruct the state of a machine at a certain point during execution of the instruction stream.

In the present example, the processing element 10 has some trace circuitry 14 within it or associated with it, which is configured to identify certain types of instructions that are being executed and/or to identify certain processing activities and, in some cases, to associate key values with instructions and the data to which the instructions are applied. The use of instruction items and data items having respective keys linking an instruction item with a related data item allows the trace apparatus to associate the execution of instructions with the results of the execution of those instructions.

The apparatus of FIG. 1 also comprises the ETM 20 that can query the trace circuitry 14 of the CPU 10 when a so-called "trace enable" is on or activated, and can receive in response to the query, information regarding the execution of the stream of instructions and where these are provided, the associated key values. In this way, the trace functionality can encompass both (a) the trace circuitry 14 of the CPU and (b) the ETM 20.

From this information the trace apparatus generates items of trace data (or trace elements) and these are output via a trace data output 22. The items of trace data can take a number of forms, but a general consideration is that in order to be analysed later, the trace data is stored in a trace data buffer.

The storage of trace data in the example of FIG. 1 is carried out by the ETR 30, which stores the trace data in system memory (for example the memory 60). The ETR therefore receives items of trace data from the ETM 20 via the trace data output 22, and provides, as an ETR output 32, the items of trace data for storage along with addresses at which those items are to be stored. These addresses are so-called virtual addresses (VA) and will be discussed below.

The ATU 42 receives the trace data and the respective VAs, and performs an address translation to translate each VA into a respective translated address. This may be a physical address (PA) (which can be used to directly access physical memory) or it may be an intermediate physical address (IPA) which requires a further stage of translation by a memory management unit under the control of a hypervisor. IPAs are used, for example, in so-called virtualised systems where security or isolation concerns mean that information about actual physical memory addresses is withheld from individual programs or operating systems, so that the hypervisor controls the final translation of IPA to PA. However, from the point of view of the ATU the translation is from a VA to a translated address. In the present examples, therefore, for clarity of the discussion the translated address will be referred to as a PA, though it will be appreciated that in other examples the translated address could be an IPA which is then subject to a further stage of translation outside of the remit or control of the ATU. In either instance, whether or not any further stage of translation is carried out, the memory 60 is accessible according to the translated address generated by the ATU 40.

The ATU 40 refers to address translation tables which may themselves be stored in the memory 60. The ATU may include a TLB such as the TLB 42, to buffer one or more address translations. This feature will be discussed further below.

Figure 2:
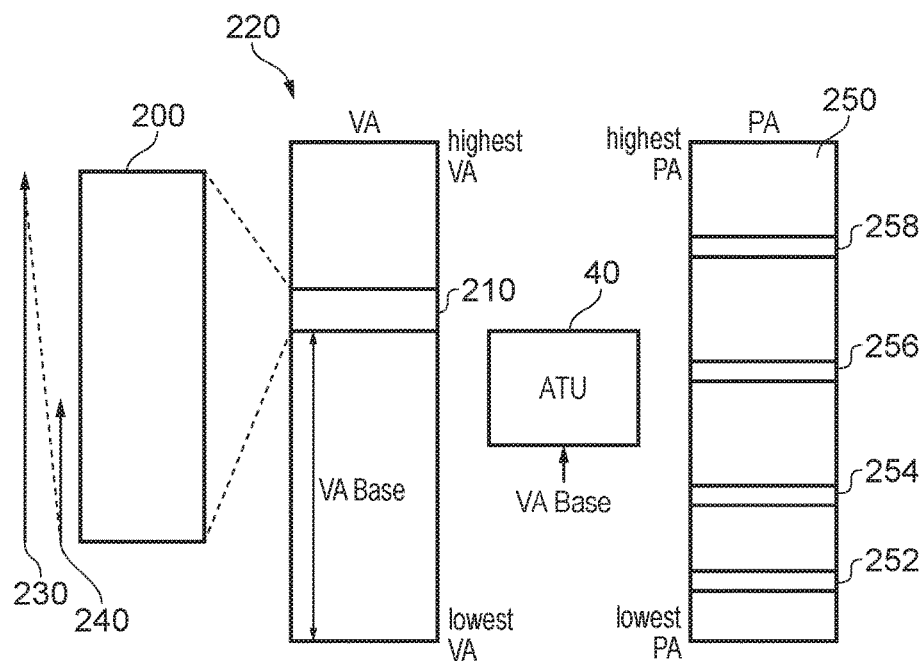
FIG. 2 schematically illustrates the operation of address translation apparatus.

FIG. 2 schematically illustrates aspect of the operation of the ATU 40.

As discussed above, as part of the trace operation of the ETM and ETR, a so-called trace data buffer is allocated for the storage of trace data generated during trace operation of the system. The trace data buffer 200 is allocated as a region of memory forming (in this example) a contiguous region 210 within the virtual memory address space 220 (drawn schematically as extending from the lowest VA, vertically (as drawn) to the highest VA in the VA space). The ETR 30 receives a stream of trace data from the ETM 20, and stores the trace data in a circular fashion in the trace data buffer. In other words, as illustrated schematically by arrows 230, 240, the ETR 30 writes trace data received from the ETM 20 into the trace data buffer so as to fill the trace data buffer (for example, as shown, from the lowest VA in the trace data buffer to the highest VA in the trace data buffer, but this could be the other way around). Then, when the trace data buffer is full, the ETR 30 either stops writing trace data to the trace data buffer (for example, so that the data as written can be analysed) or continues writing trace data, returning to writing a next item of trace data to the earliest-written VA in the trace data buffer.

The trace data is therefore written into system memory in these examples, but it is potentially difficult, under modern operating systems, to obtain a suitable contiguous region of physical memory. The allocation of physical memory to the trace data buffer is likely to be distributed or "scattered" around the available physical memory space. So, there is a need for the ATU to translate between VAs in the contiguous VA range of the trace data buffer to potentially scattered address regions in physical memory.

In FIG. 2, a physical address (PA) map 250 is illustrated schematically, extending vertically (as drawn) from a lowest PA to a highest PA, and showing a small number of example scattered memory regions 252, 254, 256, 258. Three of these regions 252, 254, 258 are (in this schematic example) mapped to regions of the VA range of the trace data buffer 210, and a fourth 256 is (in this schematic example) used to store an address translation table for use by the ATU 40. The format, operation and use of the address translation tables will be discussed in more detail below.

The regions 252 . . . 258 represent memory pages. Memory pages are defined by a constraint applied to the address translation systems in use in a particular data processing apparatus having a memory system accessible according to translated memory addresses and embody a constraint that a memory page having a memory page size represents a maximum size of a block of memory which is guaranteed to be allocated as a contiguous block in the translated address space (such as the PA space in FIG. 2). The page size in the present examples is 4 kilobytes. In other examples it could be 16 kilobytes, 64 kilobytes or another value. In some examples it can be configurable by system configuration data and/or at system initialisation and/or boot. In the present arrangements, each address translation table in the ordered set of two or more address translation tables is stored by the memory system as a memory region encompassing no more than a single memory page. That way, it is guaranteed (under the address translation constraints in use in that system) that an address translation table will be stored in a contiguous region of the translated (for example, PA) space. In some examples, each address translation table in the ordered set of two or more address translation tables is stored by the memory system as a single memory page such as a 4 kilobyte page in an arrangement that has a page granularity of 4 kilobytes such that an allocated 4 kilobyte block is guaranteed to be contiguous in the translated address space.

The ATU 40 consults the address translation tables to perform an address translation. The address translation tables provide information linking portions of the VA range 210 to respective portions of the translated (for example, PA) space 250.

In some examples, to be discussed below, the granularity of the address translation data in the address translation tables is also equal to the page size. In other words, each address translation table comprises a plurality of instances of translation data, each instance of translation data providing a mapping between a respective sub-range of the contiguous range of virtual memory addresses applicable to that address translation table and a memory page of the memory system. In these examples (in which the page granularity of the system is 4 kilobytes), one entry in an address translation table provides information to map a 4 kilobyte page of the VA range 210 to a 4 kilobyte page of the translated (PA in this example) address space.

If the CPU 10 needs to access the stored trace data, for example as part of an analysis program's operation, the CPU can use the same mappings at the MMU 16 to translate between VAs in the trace data buffer and PAs to access the memory 60.

In FIG. 2, the ATU 40 is responsive to a base address VABase. In some examples, this can be an offset which defines the VA applicable to the first address translated by the first entry in the first table in the ordered set. The ATU can subtract VABase from each input VA to arrive at the entry in the table and the correct table number. In these examples, the translation circuitry is configured to subtract an offset virtual memory address from the input virtual memory address.

In other examples, VABase can be treated as zero (that is to say, a subtraction operation is not needed) by the ETR being arranged to treat the trace data buffer as having an address range 220 starting at zero.

In other examples, VABase could simply define the VA applicable to the first entry in the first table of the ordered set (or of a particular table in the ordered set). This can then be used by the ATU to detect whether the input VA is translatable by the currently accessed table (see the step 520 below) or whether another table is required (see the step 530 discussed below).

The address translation tables will now be described with reference to FIG. 3.

The address translation tables are provided as an ordered set of two or more address translation tables. Each address translation table in the ordered set of two or more address translation tables is configured to provide translation data indicating mappings between virtual memory addresses and translated memory addresses for a contiguous range of virtual memory addresses applicable to that address translation table. The "ordering" of the ordered set of address translation tables is such that the tables are ordered with respect to one another according to an order of their respective ranges of virtual memory addresses for which they provide translation data.

Figure 3:
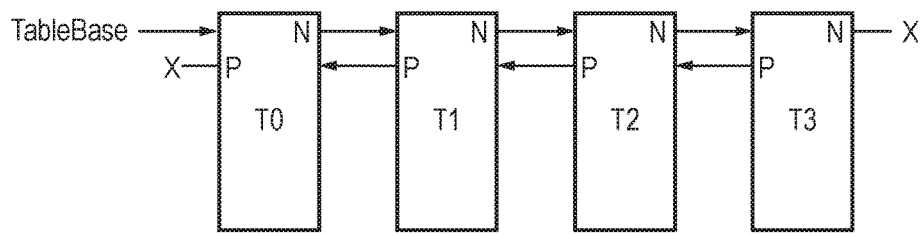
FIG. 3 schematically illustrates an ordered set of address translation tables.

So, in the example of FIG. 3, four example address translation tables T0, T1, T2, T3 are provided. These form an ordered set in the order (T0, T1, T2, T3) because the VA range translated by the table T0 is lower than the VA range translated by the table T1, which is in turn lower than the VA range translated by the table T2, which in turn is lower than the VA range translated by the table T3. The other polarity of ordering could of course be used instead (higher to lower VA ranges). In these examples, the VA ranges translated by adjacent tables in the ordered set are contiguous, which is to say that the highest VA translated by the table T0 is adjacent (in the VA space 220) to the lowest VA translated by the adjacent and next-higher (in the example ordering) table T1, and so on.

A parameter TableBase, provided (for example) by an operating system to the ATU 40 at system initialisation, provides an address in the PA space 250 of one of the tables. This could be a first table in the ordered set of tables, but does not have to be. Because of the links between tables discussed below, TableBase could in fact point to any one of the tables and still allow the ATU to access and traverse the ordered set of tables. But in the present examples, the pointer TableBase points to the first of the tables in the ordered set of tables.

The tables are linked by pointer data "N" and "P".

The pointers "N" provide the address, in the PA space 250, of the next table in the order appropriate to the ordered set of tables. This can be a first address of the table or simply an identity of the page (such as a 4 kilobyte page) in the PA space by which the next table is stored. So, the "N" pointer for the table T0 points to the storage location of the table T1, and so on. It will be seen that the table T3 does not have a valid "N" pointer (indicated by an X symbol) because it is the highest ordered table in the ordered set.

The pointers "P" provide the address, in the PA space 250, of the preceding table in the order appropriate to the ordered set of tables. Once again, this can be a first address of the table or simply an identity of the page (such as a 4 kilobyte page) in the PA space by which the preceding table is stored. So, the "P" pointer for the table T3 points to the storage location of the table T2, and so on. Again, it will be seen that the table T0 does not have a valid "P" pointer (indicated by an X symbol) because it is the lowest ordered table in the ordered set.

Therefore, in these examples, each address translation table in the ordered set of two or more address translation tables comprises location information (such as the pointers discussed above) defining the storage location of at least those of the other address translation tables in the ordered set of two or more address translation tables which are adjacent to that address translation table in the ordered set of two or more address translation tables.

The location information in the example of FIG. 3 is represented as a value in the PA space. This can save the need for translation of the location information. However, other representations such as a VA could be used.

The ATU 40, as an example of translation circuitry, accesses the ordered set of two or more address translation tables stored at respective storage locations to generate an address translation between an input virtual memory address in the virtual memory address space and a respective translated memory address in the translated memory address space.

The format of example address translation tables will be discussed with reference to FIG. 4.

As mentioned above, in some examples the address translation tables are each implemented as a respective memory page. The examples here assume a 4 kilobyte page, but as discussed above, other pages sizes are possible.

The address translation table stores or provides instances of translation data. Each instance of translation data is shown as a horizontal line in a portion 400, 420 of the page 410, 430 equal one half of the memory page for that address translation table. This arrangement means that the address translation data can be retrieved across a PA range in the page which is a power of two in extent (for a page also equal in extent to a power of two addresses in the PA space), which can simplify the addressing and support logic needed to address such entries.

Each instance of translation data, numbered from "entry 0" to "entry 255" is a 64 bit entry. So, the 4 kilobyte pages 410, 430 each contain 256 of these 64 bit entries, taking up one half of the page size (2 kilobytes). The remainder of the page provides storage for the N and P pointers (where the N pointers are indicated as "next" pointers 412, 432 and the P pointers are indicated as "prev" pointers 414, 434 in FIG. 4) and reserved space 416, 436 (which may be unused in these examples).

The N and P pointers are implemented as bits [63:12] in an example 64 bit addressing system with 4 kilobyte pages. In other words, the N and P pointers simply identify the page (in the PA space) of the next or previous table. It can be seen that the P pointer 414 points from the second table in the example ordered set of FIG. 4 (the upper table as drawn) to the first table in the example ordered set of FIG. 4 (the lower table as drawn), and the parameter TableBase 460 also points to the first table in the example ordered set. The N pointer of the first table points to the second table. Each pointer has an associated validity indicator 440 which, in these examples, is "1" to indicate that the pointer is valid, and "0" to indicate that the pointer is invalid (such as the N pointer of the second table or the P pointer of the first table). Other space 450 in each 64 bit entry is reserved, and in some examples unused.

The instances of translation data (or "entries") each comprise bits [63:12] defining a respective 4 kilobyte page in the PA space. Again, they have an associated validity pointer 440 and potentially some reserved or unused space 450. In other words, each instance of translation data has an associated indicator to indicate whether that instance of translation data represents a valid address translation.

Therefore, in these examples, each address translation table in the ordered set of two or more address translation tables comprises a plurality of instances of translation data (the entries of FIG. 4), each instance of translation data providing a mapping for a respective sub-range (such as a 4 kilobyte page) of the contiguous range of virtual memory addresses applicable to that address translation table. For example, each instance of translation data may provide a mapping of one or more bits of the input virtual memory address other than a least significant portion of the input virtual memory address (for example, bits [63:12], to respective bits of the translated memory address.

Figure 4:
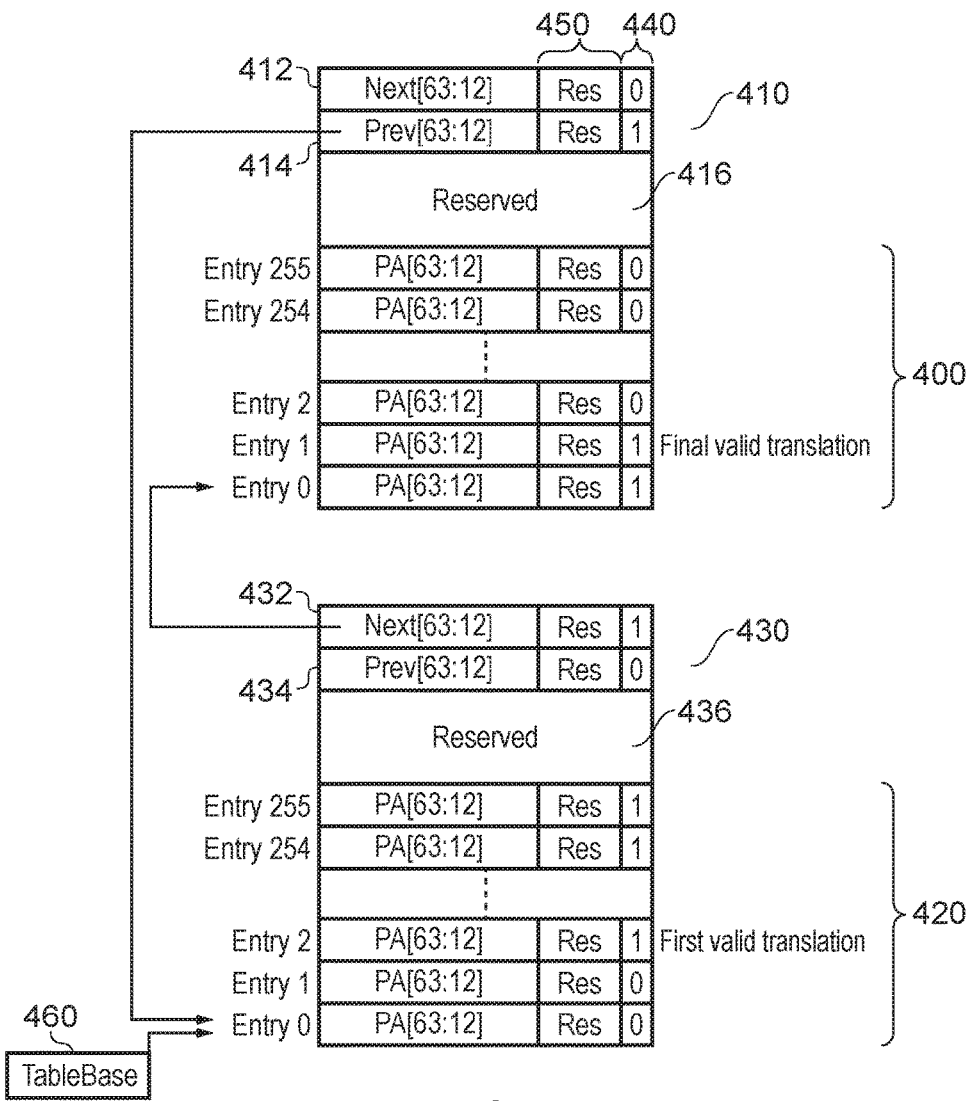
FIG. 4 schematically illustrates two address translation tables in further detail.

In FIG. 4, it can be seen that the first two entries of the first table are set as "invalid". The third entry is the first valid translation, and two tables are required even though the total number of valid entries (256 in this example) could fit into one table. The reason for this is that it allows the contiguous range of virtual memory addresses applicable to each address translation table to be aligned, within the virtual address space, to an alignment boundary selected from a set of alignment boundaries separated by a separation greater than the size, in the virtual address space, of the sub-ranges. In other words, the tables can be aligned to a granularity greater than the 4 kilobyte page size, which can lead to some pages at the start of the first table and the end of the last table being marked as invalid. In the example of FIG. 4, the tables are aligned to 1 megabyte boundaries. For example, the start address of the first table of FIG. 4 is 0x12300000 whereas the start address of the range 210 is 0x12302000. The alignment boundaries are separated in this example by 1 megabyte even though the page size (the size of a sub-range) is 4 kilobytes.

Figure 5:
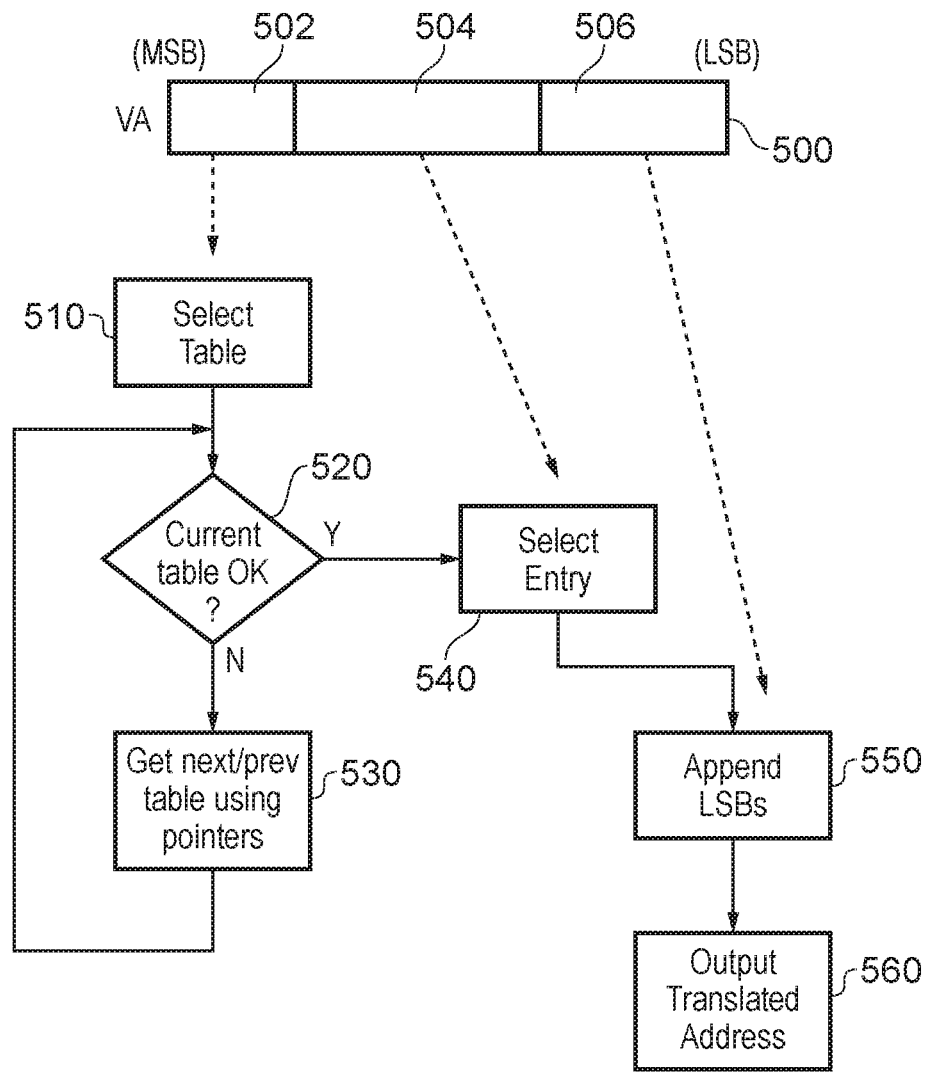
FIG. 5 is a schematic flowchart illustrating an address translation process.

The translation of an input VA will now be discussed with reference to FIG. 5.

An input VA 500, such as a 64 bit VA, is an input to the ATU 40, being supplied to the ATU by the output 32 of the ETM 30. This is considered as three portions 502, 504, 506 for the following discussion, which assumes 4 kilobyte pages and 256 entries in a 4 kilobyte address translation table, each entry of 64 bits.

The portion 502, a most significant portion of [n:20] (where n+1=64 in this example) is used to select the required address translation table at a step 510 (subtracting or applying VABase as discussed above if appropriate). At a step 520, if the required table is not the currently accessed table, then the ATU 40 uses TableBase (in the case of the first access of a table in the ordered set of tables) and/or the N or P pointers at a step 530 to traverse the ordered set of tables to arrive at the page address of the required table, which it then loads. Note that traversing in this way from the currently accessed table to the required table may take several iterations of loading at least the N or P pointers from a next table, and using those to locate a further table.

The step 510 therefore involves the translation circuitry being configured to select an address translation table from the ordered set of two or more address translation tables according to an index dependent upon a most significant portion 502 of the input virtual memory address.

The step 530 provides an example of the translation circuitry being configured, when the most significant portion of the input virtual memory address does not correspond to a currently accessed address translation table, to access another address translation table using the location information of the currently accessed address translation table.

Once the correct table is being accessed, control passes from the step 520 to a step 540, in which the ATU 40 uses a second portion, represented by the bits [19:12] in this example, to select an entry within the selected table, from the 256 entries in that table. For example, if the bits [19:12] are all zeros, the ATU selects entry 0. If the bits [19:12] are all ones, the ATU selects entry 255. There is therefore a one to one relationship between possible values of the bits [19:12] and the number of entries in the address translation table.

The ATU 40 selects the appropriate entry at the step 540. (If the entry is marked as invalid by the indicator 440, the process aborts). As illustrated in FIG. 4, the entry provides bits [63:12] of the PA or translated address. To this, the ATU 40 appends the remaining least significant portion 506 of the input VA 500, at a step 550, to output, at a step 560, the translated address.

The ATU 40 can use the TLB 42 to store the entry selected at the step 540. This can avoid the need to retrieve it again if (as may well be the case in situations such as writing (or reading) trace data where the writing or reading may well be in a linear fashion across the VA space). The TLB can also store (as a result of a fetch operation initiated by the ATU 40, for example as part of the step 540) the entry in the current table which corresponds to the next higher page of VAs. If the current entry is entry number 255 (corresponding to the highest set of VAs translated by the current table) then the ATU can use the N pointer to fetch the first (lowest VA) entry from the next table in the ordered list and store that in the TLB. In this way, the TLB is ready for subsequent translations if they occur in a generally linear fashion. Of course, the TLB could store more than just these one or two entries, for example a whole current and/or next page, but in the example of writing trace data, each entry from a table provides for 4 kilobytes of trace data to be written, and in a typical system (where maybe one byte of trace data is written for each clock cycle) this can provide sufficient time to fetch and retrieve entries on an entry by entry basis such that a two entry TLB is sufficiently sized.

The use of the TLB to store two entries in this way can provide an example of the translation circuitry (ATU 40) having a buffer (such as the TLB 42) to store at least one instance of translation data. The ATU may be configured to store in the buffer at least a first instance of translation data relating to a current input virtual memory address and a second instance of translation data relating to a sub-range of virtual memory addresses adjacent to the sub-range of virtual memory addresses of the first instance of translation data. In examples, the sub-range of virtual memory addresses of the second instance of translation data is next-higher, in the virtual address space, than the sub-range of virtual memory addresses of the first instance of translation data. In other words, the current and next (in VA order) entries may be buffered in the TLB.

Figure 6:
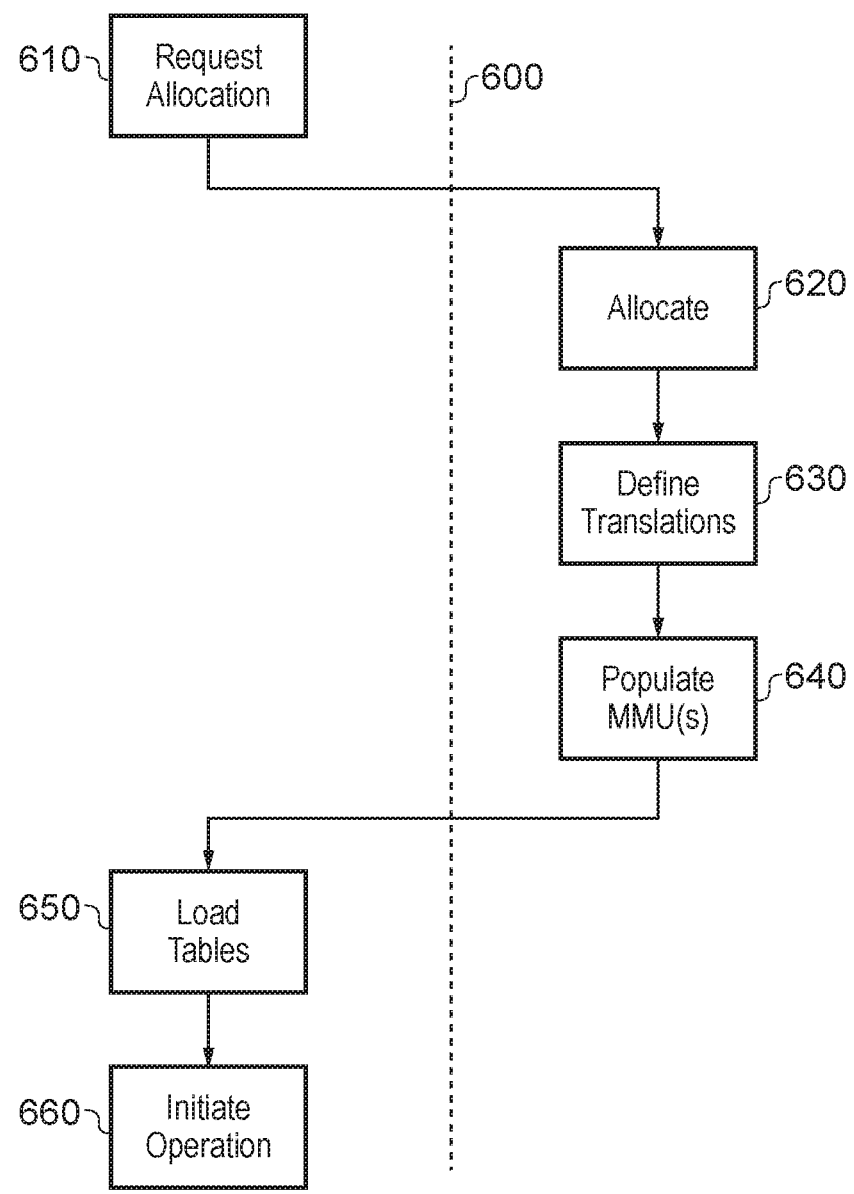
FIG. 6 is a schematic flowchart illustrating an initialisation process.

FIG. 6 is a schematic flowchart illustrating an initialisation process.

In FIG. 6, operations to the left of a broken line 600 are (in these examples) performed by a software process running on the CPU 10 or on a separate trace controller, such as a software process overseeing trace operation, and operations to the right of the broken line 600 are performed by an operating system (OS, which may also be running on the CPU 10, for example).

At a step 610, the software process requests the allocation of a memory region for use as the trace data buffer. An example might be a request for a 100 megabyte contiguous region of VA space.

At a step 620, the OS allocates the memory region. At a step 630, the OS defines translations (for example, page by page) between pages of the VA region allocated as the trace data buffer and corresponding pages in the PA space. At a step 640, the OS populates the MMU 16 for use by the CPU, and any other relevant MMUs in the system.

At a step 640, the software process creates and stores the address translation tables as an ordered set with N and P pointers, using the translation information defined at the step 630.

Then (or later) the software process initiates operation of the trace function at a step 660.

In a variation of FIG. 6, if further space is needed in the trace data buffer, the N pointer for the last table in the ordered set (initially set as "invalid") could be set to point to a new, additional table, and the ordered set of tables extended.

The arrangements discussed above have used the N and P pointers to provide location information defining the storage location of those of the other address translation tables in the ordered set of two or more address translation tables which are adjacent to that address translation table in the ordered set of two or more address translation tables. In other examples, further instances of location information could be provided in addition to the N and P pointers to adjacent tables.

Figure 7:
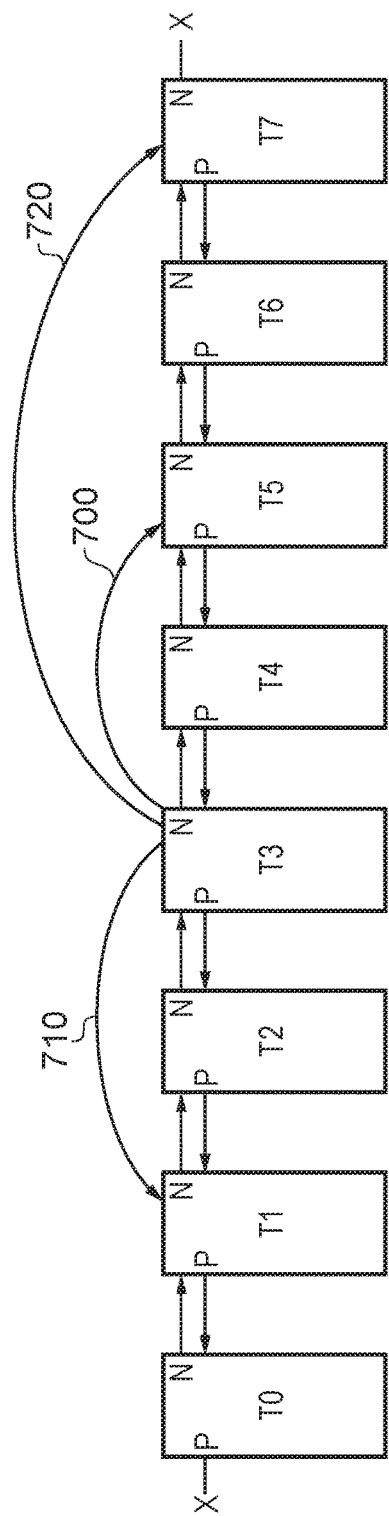
FIGS. 7 and 8 schematically illustrate example ordered sets of address translation tables.
Figure 8:
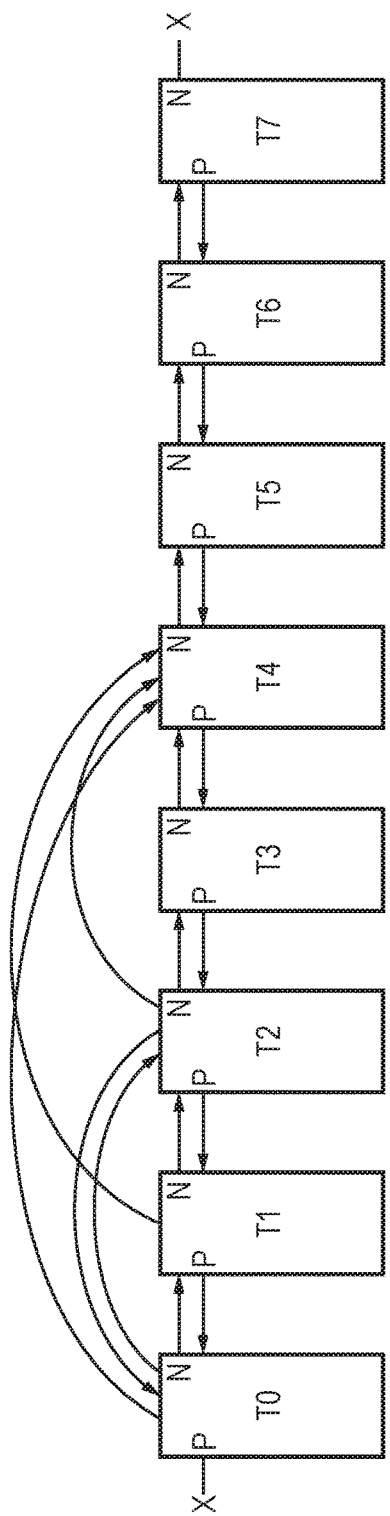

FIGS. 7 and 8 schematically illustrate examples ordered sets of eight address translation tables T0 . . . T7 having respective N and P pointers represented in FIGS. 7 and 8 according to the format discussed above.

In FIG. 7, the following additional pointers are provided (as well as N and P) and are drawn in FIG. 7 for the example table of T3. For clarity of the diagram, these pointers are not drawn (but are still used) for the other tables.

The additional pointers are one or more of:

current table+2 (700)

current table−2 (710)

current table+4 (720)

current table−4 current table+8 current table−8 and so on.

These additional pointers can be provided in the reserved area 416, 436, for example.

FIG. 8 provides another example in which the additional pointers' destinations are powers of two in the table order. So, there are provided pointers having destinations as T0, T2, T4, T8 and so on.

An example equation to represent the pointers would be, for Table X, a step M would result in pointing to Table:

Forwards: $(X-(X \bmod M))+M$

Backwards: $(X-(X \bmod M))-M$ where (in this example) M is always a power of 2.
For example, forwards:

Table 0, $M=2$: $(0-(0\%2))+2=T2$

Table 0, $M=4$: $(0-(0\%4))+4=T4$

Table 0, $M=8$: $(0-(0\%8))+8=T8$

Table 1, $M=2$: $(1-(1\%2))+2=T2$

Table 1, $M=4$: $(1-(1\%4))+4=T4$

Table 1, $M=8$: $(1-(1\%8))+8=T8$

Table 19, $M=2$: $(19-(19\%2))+2=T20$

Table 19, $M=4$: $(19-(19\%4))+4=T20$

Table 19, $M=8$: $(19-(19\%8))+8=T24$

For example, backwards:

Table 16, $M=2$: $(16-(16\%2))-2=T14$

Table 16, $M=4$: $(16-(16\%4))-4=T12$

Table 16, $M=8$: $(16-(16\%8))-8=T8$

Table 19, $M=2$: $(19-(19\%2))-2=T16$

Table 19, $M=4$: $(19-(19\%4))-4=T12$

Table 19, $M=8$: $(19-(19\%8))-8=T8$

This is just one example of the power-of-2 steps. There are various other possible equations to implement this type of traversal.

The use of the additional pointers is relevant to the step 530, and can be appropriate in an instance in which a traverse from the currently accessed table to a next required table is such that the position in the ordered set of tables of the next required table is more than one different to the currently accessed table. By using the additional pointers, fewer operations may be required to implement the step 530.

Therefore, FIGS. 7 and 8 provide examples in which one or more of the address translation tables in the ordered set of two or more address translation tables comprise further location information defining the storage location of one or more other address translation tables in the ordered set of two or more address translation tables separated from that address translation table by two or more positions in the ordered set of two or more address translation tables.

As discussed above, the data processing apparatus of FIG. 1 may comprise trace apparatus 20, 30 configured to generate items of trace data indicative of processing activities of a processing element, the trace apparatus being configured to store the trace data according to respective virtual memory addresses; and address translation apparatus 40 configured to translate the virtual memory addresses for storage of the trace data into respective translated memory addresses.

Similarly, example embodiments provide trace apparatus comprising address translation apparatus 40, and trace circuitry 20, 30 configured to generate items of trace data indicative of processing activities of a processing element, the trace apparatus being configured to store the trace data according to respective virtual memory addresses, the address translation apparatus being configured to translate the virtual memory addresses for storage of the trace data into respective translated memory addresses.

Figure 9:
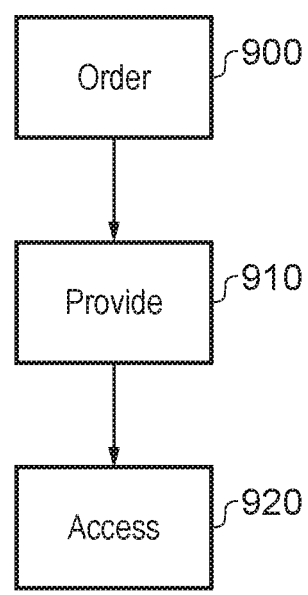
FIG. 9 is a schematic flowchart illustrating a method.

FIG. 9 is a schematic flowchart illustrating an address translation method comprising:

ordering (at a step 900) a set of two or more address translation tables, stored at respective storage locations and which provide translation data indicating mappings between virtual memory addresses in a virtual memory address space and translated memory addresses in a translated memory address space for a contiguous range of virtual memory addresses applicable to that address translation table, with respect to one another according to an order of their respective ranges of virtual memory addresses for which they provide translation data;

providing (at a step 910), by each address translation table in the ordered set of two or more address translation tables, location information defining the storage location of at least any of the other address translation tables in the ordered set of two or more address translation tables which are adjacent to that address translation table in the ordered set of two or more address translation tables; and accessing (at a step 920) an address translation table in the ordered set of two or more address translation tables to generate an address translation between an input virtual memory address in the virtual memory address space and a respective translated memory address in the translated memory address space.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Address translation apparatus comprising:
    translation circuitry to access an ordered set of two or more address translation tables stored at respective storage locations to generate an address translation between an input virtual memory address in a virtual memory address space and a respective translated memory address in a translated memory address space;
    in which:
    each address translation table in the ordered set of two or more address translation tables is configured to provide translation data indicating mappings between virtual memory addresses and translated memory addresses for a contiguous range of virtual memory addresses applicable to that address translation table;
    the ordered set of address translation tables are ordered with respect to one another according to an order of their respective ranges of virtual memory addresses for which they provide translation data; and
    each address translation table in the ordered set of two or more address translation tables comprises location information defining the storage location of at least those of the other address translation tables in the ordered set of two or more address translation tables which are adjacent to that address translation table in the ordered set of two or more address translation tables.

2. Apparatus according to claim 1, in which each address translation table in the ordered set of two or more address translation tables comprises a plurality of instances of translation data, each instance of translation data providing a mapping for a respective sub-range of the contiguous range of virtual memory addresses applicable to that address translation table.

3. Apparatus according to claim 2, in which each instance of translation data provides a mapping of one or more bits of the input virtual memory address other than a least significant portion of the input virtual memory address, to respective bits of the translated memory address.

4. Apparatus according to claim 3, in which each instance of translation data has an associated indicator to indicate whether that instance of translation data represents a valid address translation.

5. Apparatus according to claim 4, in which the contiguous range of virtual memory addresses applicable to each address translation table is aligned, within the virtual address space, to an alignment boundary selected from a set of alignment boundaries separated by a separation greater than the size, in the virtual address space, of the sub-ranges.

6. Apparatus according to claim 1, in which the translation circuitry is configured to select an address translation table from the ordered set of two or more address translation tables according to an index dependent upon a most significant portion of the input virtual memory address.

7. Apparatus according to claim 6, in which the translation circuitry is configured, when the most significant portion of the input virtual memory address does not correspond to a currently accessed address translation table, to access another address translation table using the location information of the currently accessed address translation table.

8. Apparatus according to claim 2, comprising a buffer to store at least one instance of translation data.

9. Apparatus according to claim 8, in which the translation circuitry is configured to store in the buffer at least a first instance of translation data relating to a current input virtual memory address and a second instance of translation data relating to a sub-range of virtual memory addresses adjacent to the sub-range of virtual memory addresses of the first instance of translation data.

10. Apparatus according to claim 9, in which the sub-range of virtual memory addresses of the second instance of translation data is next-higher, in the virtual address space, than the sub-range of virtual memory addresses of the first instance of translation data.

11. Apparatus according to claim 1, in which the translation circuitry is configured to subtract an offset virtual memory address from the input virtual memory address.

12. Apparatus according to claim 1, in which one or more of the address translation tables in the ordered set of two or more address translation tables comprise further location information defining the storage location of one or more other address translation tables in the ordered set of two or more address translation tables separated from that address translation table by two or more positions in the ordered set of two or more address translation tables.

13. Trace apparatus comprising:
    address translation apparatus according to claim 1; and
    trace circuitry configured to generate items of trace data indicative of processing activities of a processing element, the trace apparatus being configured to store the trace data according to respective virtual memory addresses;
    the address translation apparatus being configured to translate the virtual memory addresses for storage of the trace data into respective translated memory addresses.

14. Data processing apparatus comprising:
    address translation apparatus according to claim 1; and
    a memory system accessible according to the translated memory addresses;
    in which:
    the memory system is accessible by translated memory addresses subject to a constraint that a memory page having a memory page size represents a maximum size of a block of memory which is guaranteed to be allocated as a contiguous block in the translated address space; and
    each address translation table in the ordered set of two or more address translation tables is stored by the memory system as a memory region encompassing no more than a single memory page.

15. Data processing apparatus according to claim 14, in which each address translation table in the ordered set of two or more address translation tables is stored by the memory system as a single memory page.

16. Data processing apparatus according to claim 15, in which each address translation table in the ordered set of two or more address translation tables comprises a plurality of instances of translation data, each instance of translation data providing a mapping between a respective sub-range of the contiguous range of virtual memory addresses applicable to that address translation table and a memory page of the memory system.

17. Data processing apparatus according to claim 15, in which:
the instances of translation data for an address translation table in the ordered set of two or more address translation tables are stored as one half of the memory page for that address translation table.

18. Data processing apparatus according to claim 14, comprising:
trace apparatus configured to generate items of trace data indicative of processing activities of a processing element;
the trace apparatus being configured to store the trace data according to respective virtual memory addresses; and
the address translation apparatus being configured to translate the virtual memory addresses for storage of the trace data into respective translated memory addresses.

19. Address translation apparatus comprising:
translation means for accessing an ordered set of two or more address translation table means stored at respective storage locations and for generating an address translation between an input virtual memory address in a virtual memory address space and a respective translated memory address in a translated memory address space;
in which:
each address translation table means in the ordered set of two or more address translation table means is operable to provide translation data indicating mappings between virtual memory addresses and translated memory addresses for a contiguous range of virtual memory addresses applicable to that address translation table means;
the ordered set of address translation table means are ordered with respect to one another according to an order of their respective ranges of virtual memory addresses for which they provide translation data; and
each address translation table means in the ordered set of two or more address translation table means comprises location information defining the storage location of at least any of the other address translation table means in the ordered set of two or more address translation table means which are adjacent to that address translation table means in the ordered set of two or more address translation table means.

20. An address translation method comprising:
ordering a set of two or more address translation tables, stored at respective storage locations and which provide translation data indicating mappings between virtual memory addresses in a virtual memory address space and translated memory addresses in a translated memory address space for a contiguous range of virtual memory addresses applicable to that address translation table, with respect to one another according to an order of their respective ranges of virtual memory addresses for which they provide translation data;
providing, by each address translation table in the ordered set of two or more address translation tables, location information defining the storage location of at least any of the other address translation tables in the ordered set of two or more address translation tables which are adjacent to that address translation table in the ordered set of two or more address translation tables; and
accessing an address translation table in the ordered set of two or more address translation tables to generate an address translation between an input virtual memory address in the virtual memory address space and a respective translated memory address in the translated memory address space.

* * * * *